US009463603B2

(12) United States Patent
Chadwick et al.

(10) Patent No.: US 9,463,603 B2
(45) Date of Patent: *Oct. 11, 2016

(54) METHOD FOR FABRICATION OF A NON-PNEUMATIC SURVIVABLE TIRE AND WHEEL ASSEMBLY

(71) Applicant: The Boeing Company, Chicago, IL (US)

(72) Inventors: D'Arcy R. Chadwick, Elma, WA (US); Daniel J. Perron, Federal Way, WA (US); Eldon C. Rogers, Auburn, WA (US); Darrell M. Storvick, Tukwila, WA (US); Timothy L. Williams, Seattle, WA (US); Dennis Yee, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 478 days.

This patent is subject to a terminal disclaimer.

(21) Appl. No.: 14/028,129

(22) Filed: Sep. 16, 2013

(65) Prior Publication Data

US 2014/0034219 A1    Feb. 6, 2014

Related U.S. Application Data

(62) Division of application No. 12/855,622, filed on Aug. 12, 2010, now Pat. No. 8,555,941.

(51) Int. Cl.
*B29D 30/02* (2006.01)
*B60C 7/18* (2006.01)

(52) U.S. Cl.
CPC ............... *B29D 30/02* (2013.01); *B60C 7/18* (2013.01); *B60C 2007/107* (2013.04); *Y10T 29/49494* (2015.01); *Y10T 29/49538* (2015.01); *Y10T 152/10* (2015.01)

(58) Field of Classification Search
CPC ..... B29D 30/02; B60C 7/18; B60C 2007/107; Y10T 152/10; Y10T 152/10297; Y10T 29/49538; Y10T 29/4954; Y10T 29/49494; Y10T 29/49952; Y10T 29/49957
See application file for complete search history.

(56) References Cited

U.S. PATENT DOCUMENTS

| | | | | |
|---|---|---|---|---|
| 811,232 A * | 1/1906 | Lang | | B60C 7/12 152/328 |
| 1,343,684 A * | 6/1920 | Runyan | | B60C 7/125 101/376 |
| 4,033,395 A * | 7/1977 | Berg | | B29D 30/02 152/310 |
| 5,042,544 A * | 8/1991 | Dehasse | | B60C 7/12 152/302 |
| 7,418,988 B2 * | 9/2008 | Cron | | B60C 7/18 152/11 |
| 2006/0118223 A1 * | 6/2006 | Maeda | | B29D 30/02 152/323 |
| 2007/0267116 A1 * | 11/2007 | Rhyne | | B60C 7/18 152/246 |
| 2009/0107596 A1 * | 4/2009 | Palinkas | | B29D 30/02 152/209.1 |
| 2009/0211674 A1 * | 8/2009 | Hanada | | B60C 7/12 152/53 |
| 2009/0283185 A1 * | 11/2009 | Manesh | | B60B 9/00 152/11 |

* cited by examiner

*Primary Examiner* — Sarang Afzali
(74) *Attorney, Agent, or Firm* — Felix L. Fischer

(57) ABSTRACT

A non-pneumatic tire and wheel assembly is fabricated by forming inner and outer mold elements having apertures to receive casting blocks. A tread having an inner wall is prepared for casting and fill apertures are machined in a rim of a metal wheel. The tread, the outer mold element, the wheel, the inner mold element and the rubber casting blocks are assembled and an elastomer is introduced into the mold assembly through fill tubes inserted in the fill apertures of the wheel. The elastomer is allowed to cure at room temperature to form a tire body element and the rubber casting blocks and inner and outer mold elements are disassembled. A post-cure of the disassembled tire body element is accomplished at a high temperature.

20 Claims, 11 Drawing Sheets

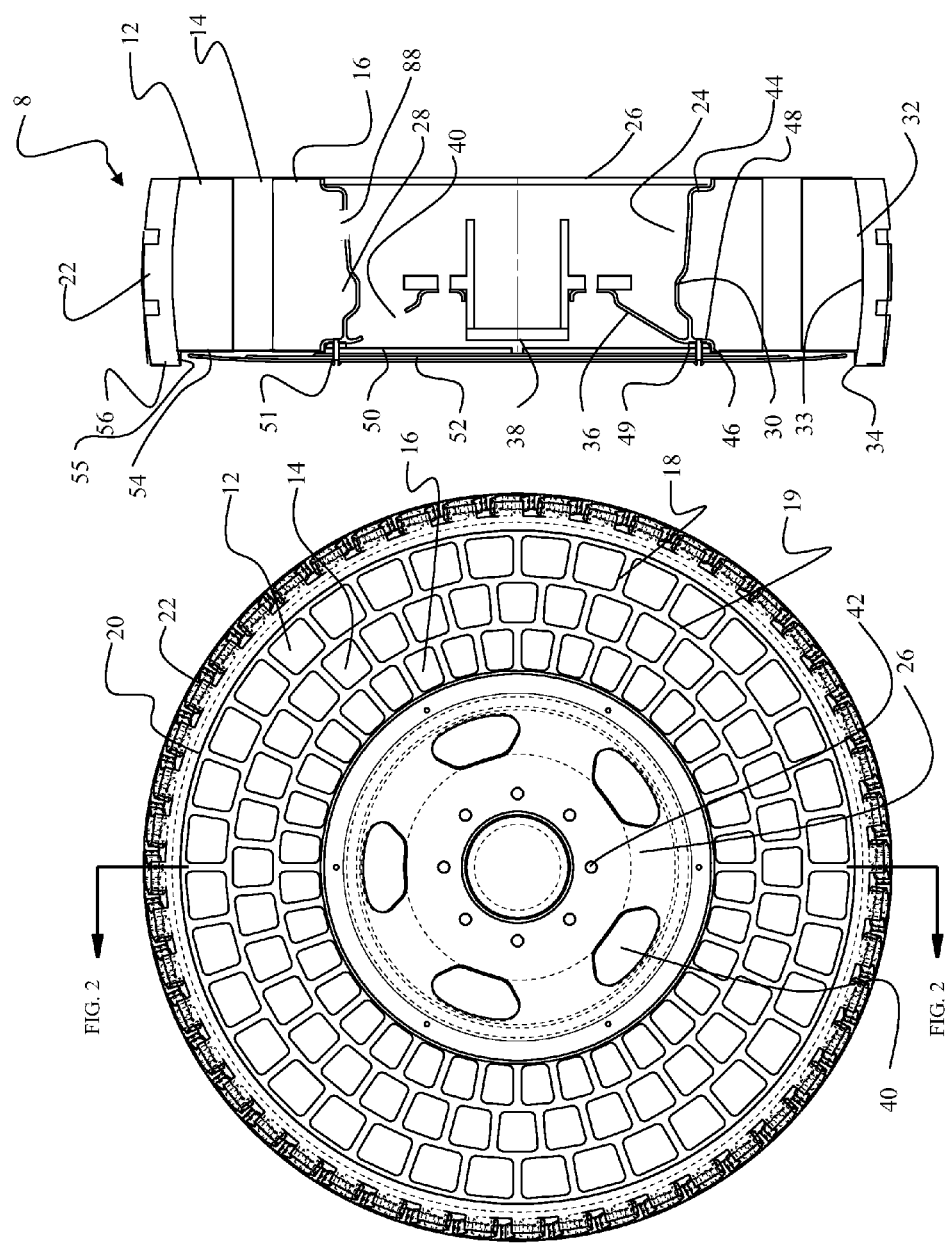

METHOD FOR FABRICATION OF A NON-PNEUMATIC SURVIVABLE TIRE AND WHEEL ASSEMBLY

REFERENCE TO RELATED APPLICATIONS

This application is a division of application Ser. No. 12/855,622 filed on Aug. 12, 2010, now U.S. Pat. No. 8,555,941, entitled NON-PNEUMATIC SURVIVABLE TIRE, COVER AND FABRICATION PROCESSES having a common assignee with the present application, the disclosure of which is incorporated herein by reference.

BACKGROUND INFORMATION

1. Field

Embodiments of the disclosure relate generally to the field of non-pneumatic tires and more particularly to embodiments for a survivable non-pneumatic tire having molded construction with a flexible spoke structure for tactical wheeled vehicle application including a recessed/protected wheel cover/mud guard and methods for fabrication of the wheel and cover.

2. Background

Tactical military vehicles are subject to extreme environments and the potential for combat damage. Existing pneumatic tires in use on many vehicles may be vulnerable to blast and fragmentation effects from improvised explosive devices (IED) and other explosive or penetrating threats which render military vehicles inoperable and can leave their crew stranded in harms way. Additionally, flexing of tire walls in pneumatic tires may create heating that may increase detectable thermal emissions. Armor shielding provides protection from small arms fire and fragments, but greatly increases vehicle weight, reduces payload, reduces mobility and maneuverability, and reduces vehicle range. Existing wheel/tire covers are mounted outboard of the pneumatic tire due to the tire wall bulge where they are vulnerable to terrain obstacles and may be damaged or destroyed in the course of rugged terrain operations.

Non-pneumatic tires have been introduced for improved durability and puncture resistance on vehicles for many applications including tactical military vehicles for the ability to withstand blast effects and projectile punctures that could disable a vehicle with pneumatic tires. Solid rubber tires provide desired puncture resistance but may be heavy and have excessive rotating inertia for many desired applications. Wheel/tire combinations created from plastic or composite matrix materials are entering use but may be difficult to fabricate in a manner to be interchangeable with existing pneumatic tire and wheel systems on vehicles.

It is therefore desirable to provide non-pneumatic tire/wheel combinations which exhibit the desired survivability capabilities. It is also desirable to provide non-pneumatic tire/wheel combinations that are interchangeable with existing pneumatic tire/wheel systems.

SUMMARY

Embodiments disclosed herein provide a non-pneumatic tire and wheel assembly which incorporates a tire tread and a conventional vehicle wheel with an elastomer tire body element molded for engagement intermediate the tread and wheel. The tire body element includes multiple concentric layers with alternating spokes.

In certain embodiments the molded elastomer tire body element has an outer surface recessed from the tire tread and further incorporates a bonded multilayer cover received within the recess. A mounting plate is bonded to the cover and attached to the wheel.

Fabrication of the non-pneumatic tire and wheel assembly is accomplished by forming inner and outer mold elements with strut and aperture dimensions adapted for the desired spoke design and mating rubber cast blocks to be received in the mold elements. A tread is prepared for casting and a conventional wheel is machined with fill apertures in a rim of the wheel. The tread, outer mold element, wheel, inner mold element and rubber casting blocks are then assembled and an elastomer is introduced into the mold assembly through fill tubes inserted in the fill apertures of the wheel. The elastomer is allowed to dry and the rubber blocks and mold elements are then disassembled from the non-pneumatic tire and wheel assembly. A high temperature cure is then accomplished.

For the embodiments including the cover, mating holes are machined in an outer recess of a rim of the wheel. A cover is fabricated by sequential layup of concentric layers and bonding of the layers. The cover is then attached to a mounting ring and the cover and mounting ring are attached to the wheel using fasteners received in the machined mating holes in the wheel rim.

The features, functions, and advantages that have been discussed can be achieved independently in various embodiments of the present disclosure or may be combined in yet other embodiments further details of which can be seen with reference to the following description and drawings.

BRIEF DESCRIPTION OF THE DRAWINGS

FIG. 1 is a side view of an embodiment of the non-pneumatic tire and wheel assembly with cover;

FIG. 2 is a front section view of the embodiment of FIG. 1;

DETAILED DESCRIPTION

The embodiments described herein with respect to tactical vehicle use provide a non-pneumatic tire with hollow spokes that do not block blast pressure, instead allowing the pressure wave to pass-through the tire venting the pressure and reducing likelihood of the tire being blown off the wheel during a blast event. The exemplary urethane cast tire is resistant to small arms fire and is not compromised from minor small arms bullet impacts. Since the tire is non-pneumatic, it does not suffer from air leakage if/when punctured. The urethane spokes are durable and of sufficient number and strength to provide redundant functionality even after punctures from bullets, nails or other small projectiles. Concentric spoke layers allow a greater number of load paths and flexibility. These redundant load paths provide greater tolerance to IED blast protection and small arms fire. "Run flat or damaged" capability is inherent by eliminating the need for the tire to contain pressurized air.

The embodiments further incorporate a cover that mounts inset to the wheel tread providing high durability since the cover does not protrude beyond the outer profile of the tire tread reducing exposure to potentially damaging debris such as rocks and sticks during operations. Convex shape of the cover and durable material returns to original form after buckling during compression of the tire/wheel in operation. The cover keeps the tire spokes from filling with mud and dirt thereby maintaining wheel balance and ride smoothness. The combination of the elements in the embodiments reduces heat emissions associated with pneumatic tires by eliminating the rubber sidewalls found on pneumatic tires and masking the tire/wheel with the wheel cover.

The fabrication process for the disclosed embodiments allows for ease of manufacture of the wheel/tire combination and design parameters such as spoke thickness/reinforcing fibers can easily be varied to match vehicle load requirements and ride flexibility. Further, the tire/wheel fabrication process uses original equipment manufacturer (OEM) rims and therefore can be built for any wheeled vehicle, including tactical vehicles such as HMMWV or Stryker providing design and manufacturing cost savings.

Figure 3:
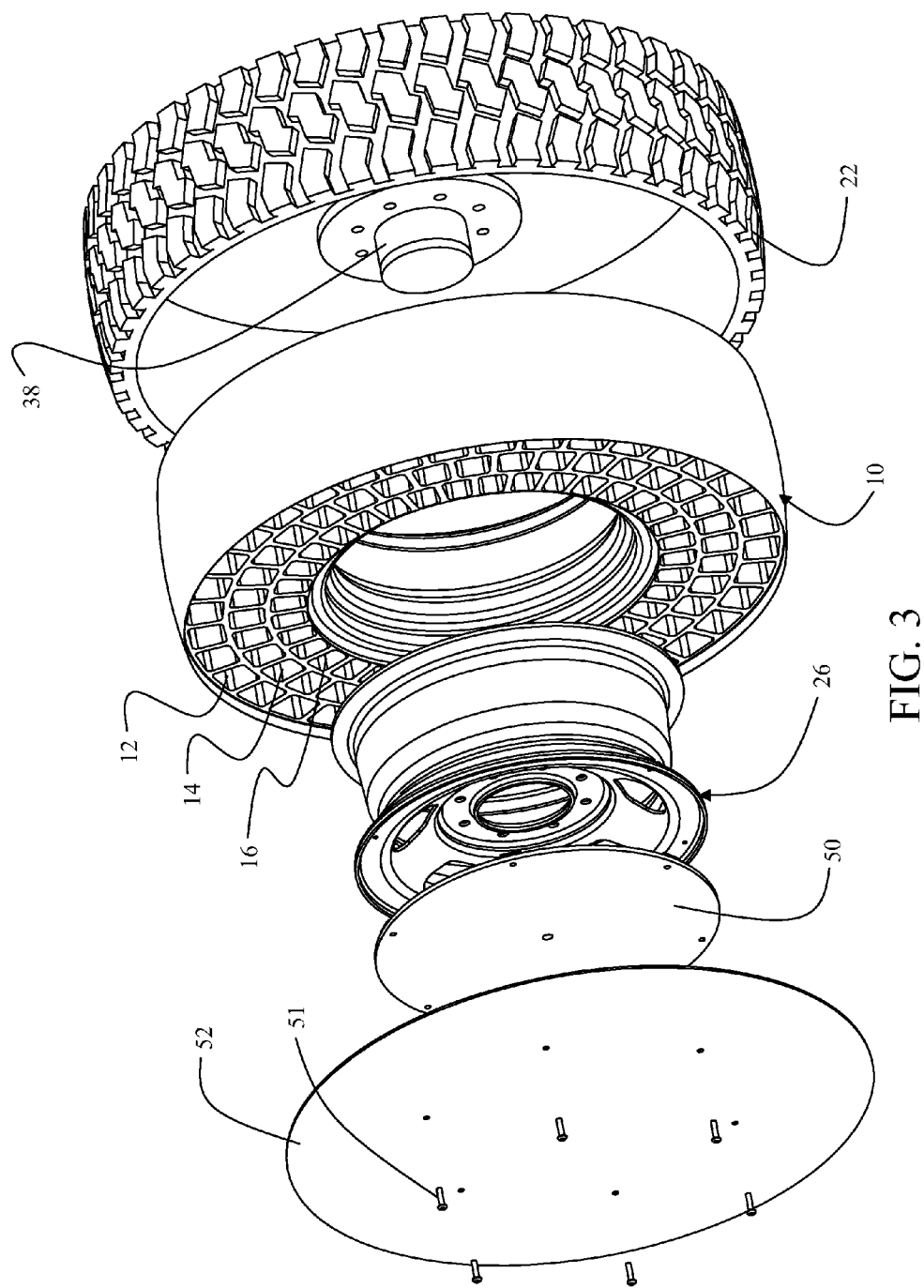
FIG. 3 is an isometric exploded view of the elements of the embodiment of FIG. 1.

Referring to FIGS. 1, 2 and 3, the embodiment shown provides a non-pneumatic tire and wheel assembly 8 which incorporates a molded elastomer tire body element 10 having concentric layers 12, 14, 16 with alternating spokes 18 of elastomer web extending between concentric rings 19. For the exemplary embodiments disclosed herein, urethane is employed as the elastomer. However, depending on specific application requirements for the vehicle tire similar materials with durometers ranging from approximately 40 to 90 on the Shore A scale may be employed. The tire body element 10 is engaged at an outer circumference 20 by a tread 22 of vulcanized rubber or similar material having a traction lug and groove pattern comparable to conventional pneumatic tires. The tread may be similar in design and construction to a tread blank employed in retreading of conventional pneumatic tires. Inner circumference 24 of the tire body element engages a conventional vehicle wheel 26 which may be constructed in conventional fashion with forged, pressed or cast steel or aluminum structure. As will be described in greater detail subsequently, the tire body element 10 is molded in place on the wheel providing an inner circumferential engagement protrusion 28 extending into the recessed wheel external rim profile 30. Similarly, an outer circumferential engagement dome 32 is present on the outer circumference of the tire body element which engages a mating depression 33 in the inner wall 34 of the tread. The inner circumferential engagement protrusion 28 and outer circumferential engagement dome 32 enhance engagement of the tire body element to the wheel and tread to prevent separation during operation. In alternative embodiments additional adherence features may be employed in the wheel and/or tread for additional engagement of the molded tire body element.

The wheel incorporates a web 36 extending from rim 26 for standard engagement of a vehicle axle hub 38. The web may include ventilating perforations 40 for brake cooling or wheel weight reduction and includes standard lug bores 42 for attachment of the wheel to the hub. An inner bead ring 44 and outer bead ring 46 terminate the rim profile and a relief 48 associated with the outer bead ring receives spacers 49 for a mounting plate 50.

Figure 4:
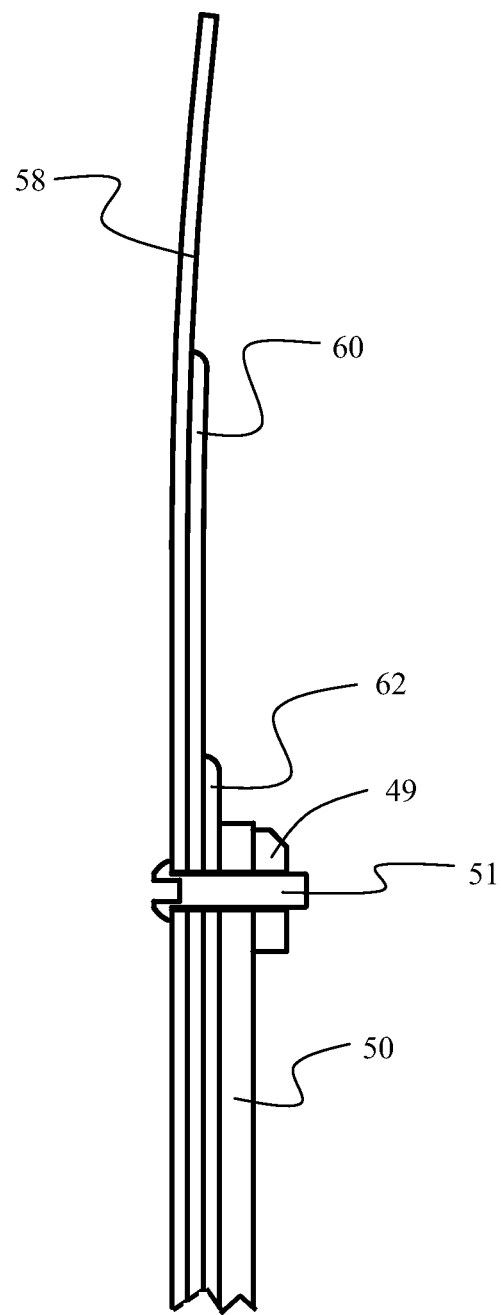
FIG. 4 is a partial side section view of the cover.

A cover 52 is received on an outer surface 54 of the tire body element and attached with mounting plate 50 with fasteners 51 through spacers 49. The outer surface is inset from the tread side wall 56 placing the cover in a protected relief in the tread and tire body element to reduce exposure to potentially damaging debris such as rocks and sticks during operations. The cover reduces mud and dirt introduction into the tire body element spokes 18 from the exterior of the mounted wheel thereby maintaining wheel balance and ride smoothness. Cover 52 is convex with respect to outer surface 54 thereby providing resiliency to return to original form after buckling during compression of the tire/wheel in operation. The cover for the embodiment shown is a multilayered concentric composite structure. For the embodiment shown, the cover incorporates three layers 58, 60 and 62 of concentrically reduced radii from inner to outer layer as shown in FIG. 4. Mounting plate 50 is bonded to cover 52 for attachment to the wheel. For the embodiment shown, fasteners 51 are quick release ball lock alignment pins extending through the mounting plate and into the wheel rim.

For exemplary embodiments, the elastomeric material employed for the tire body element is urethane such as PR1664D two-part, castable 100% solids, polyurethane elastomer produced by PRC-DeSoto International, Inc., CDP Division, 2817 Empire Avenue, Burbank, Calif. 91504. Materials for alternative embodiments may include Two Component Polyurethane Cast Elastomer Systems such as Tadco S Series with Shore Hardness from A70 to A99 produced by T.A. Davies Company, 19500 S Alameda St., East Rancho Dominguez Calif. (having Polyether (PTMEG) Polyol Mixture and Polyether or Polyester/MDI Quasi-Prepolymer Isocyanate) and industrial tire rubber compounds such as natural rubber, styrene butadiene rubber, and polybutadiene rubber. The resiliency of the tire body element is determined based on the urethane composition and spoke design. Web thickness of the web for the spokes in the exemplary embodiments ranges in thickness from approximately $\frac{1}{16}$" to $\frac{1}{2}$" depending on specific application. For the exemplary embodiment shown in the drawings, the radial spokes in the concentric layers are 0.375"and the concentric rings between the spokes are 0.3125". The spokes may be varied in the adjacent concentric layers of alternative embodiments for tailoring overall wheel/tire body element flexure during operation. In the embodiment shown, the spokes alternate for symmetrical adjacent support of spokes in adjacent layers. Additionally, a simple rectangular or trapezoidal design is shown for the cross section of the spokes. In alternative embodiments a profiled cross section may be employed for performance enhancement. Hardness (or flexibility) of the spokes 18 and concentric rings 19 may be of constant durometer throughout the concentric layers, or may vary by up to 50% to optimize performance for flexibility of the entire tire body element. The spoke design for the embodiment shown provides a net open area of 84% of the total surface of the tire body element thereby reducing the likelihood of penetration of spokes by projectiles such as small arms fire and maximizing the blow through open area for blast survivability. In various embodiments employing differing numbers of concentric layers and spoke thickness a range of approximately 60% to 85% may provide optimum design. The alternating symmetrical adjacent support allows fracture or destruction of a number of spokes in the wheel without a disabling performance reduction in the wheel/tire body element system. To enhance blast performance, the solid cover may be configured to blow off the tire/wheel when subjected to blast forces. The cover may be attached either with pressure-sensitive fasteners (such as plastic rivets or deformable plastic nuts) or frangible fasteners (or both).

The combination of the tire body element and cover in the embodiments shown reduces heat emissions associated with pneumatic tires by eliminating the rubber sidewalls found on pneumatic tires and by masking the tire body element and wheel with the wheel cover.

Figure 5A:
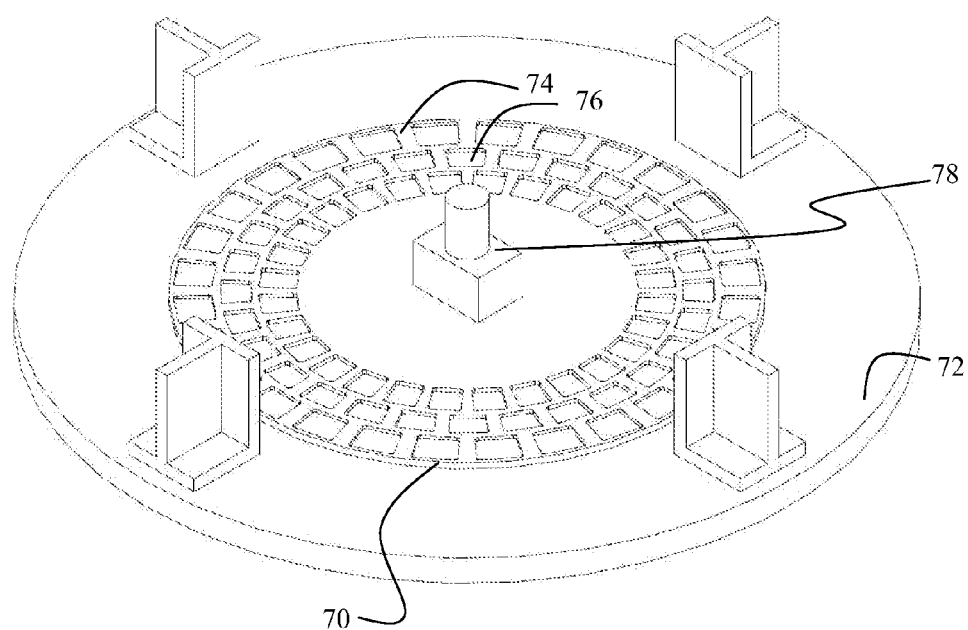
FIG. 5A is an isometric view of the inner tool for molding fabrication of the embodiment of FIG. 1.
Figure 5B:
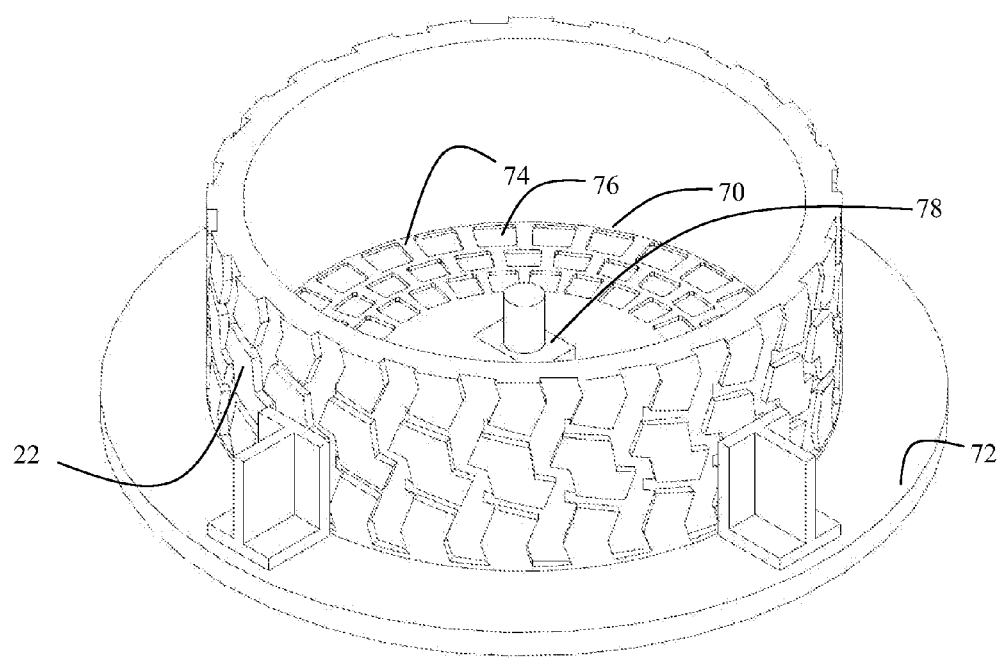
FIG. 5B is the isometric view of FIG. 5A with the tire tread inserted over the inner tool.

Fabrication of the non-pneumatic tire and wheel assembly of the exemplary embodiments is accomplished by casting with a pour molding process. As shown in FIGS. 5A and 5B, an outer mold element 70 is received within the tread 22. In various embodiments, outer mold element 70 may extend from a flat plate 72 with the thickness of the outer mold element corresponding to the recess depth of the tire body element outer surface 54 from the tread outer wall 56 or have an outer rim for engagement of the tread outer wall 56 for accurate depth placement within the tread to create a recess 55 in the tire body element outer surface 54. The outer mold element incorporates struts 74 corresponding to the spoke locations in the tire body element with apertures 76 to receive rubber mold blocks as will be described in greater detail subsequently. A center post 78 extends from the outer mold element for centering and mounting wheel 26.

Figure 6A:
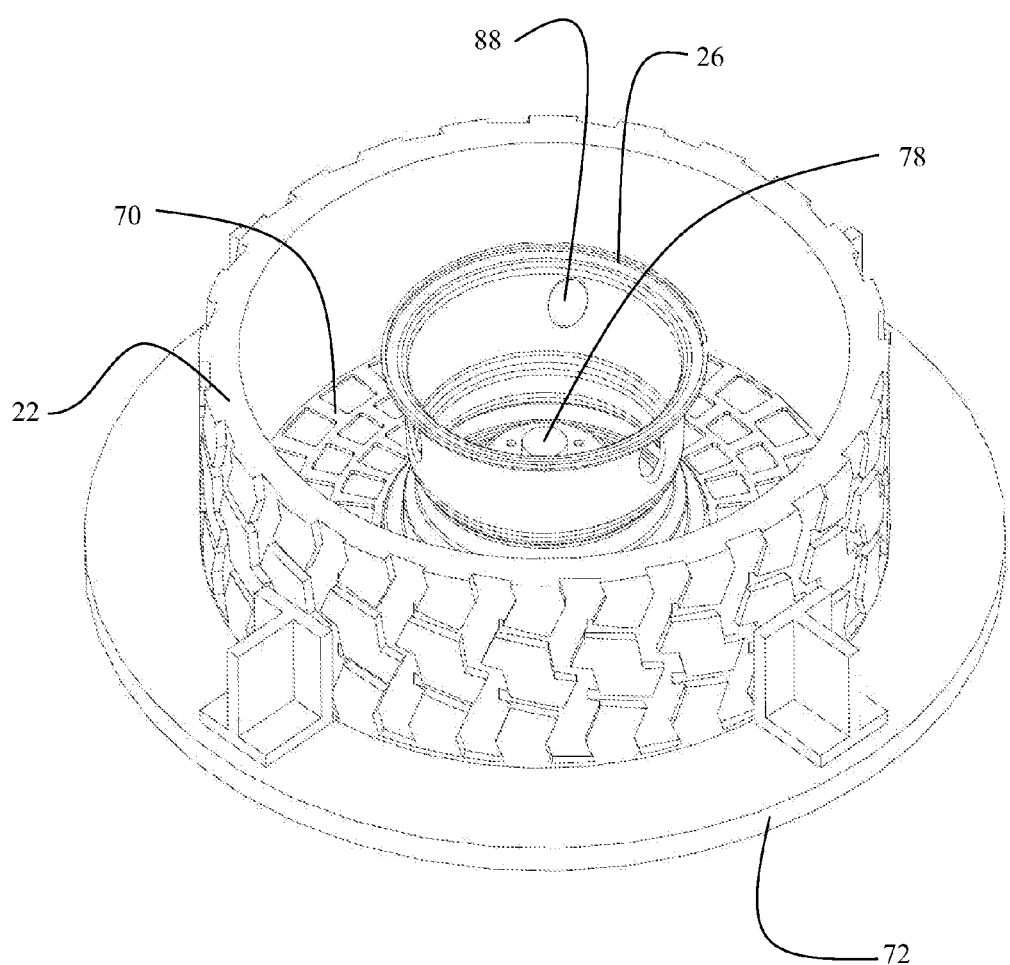
FIG. 6A is a the isometric view of FIG. 5B with the convention wheel mounted in the tooling.
Figure 6B:
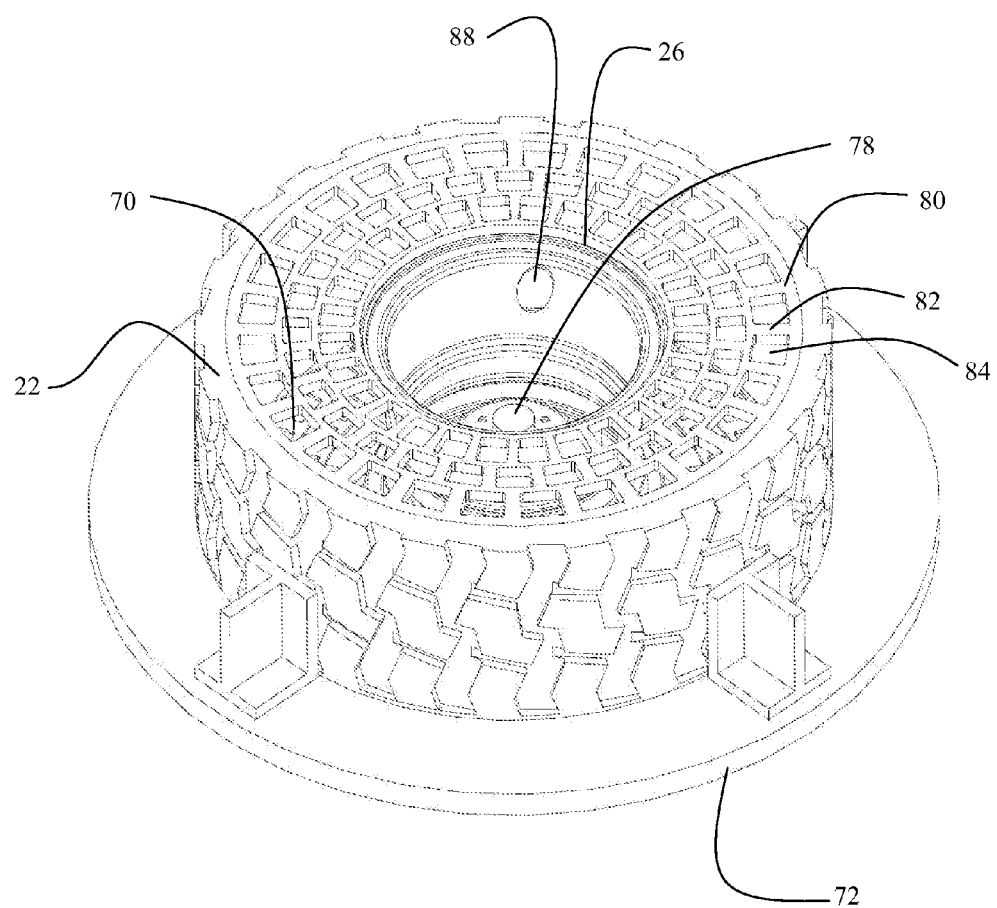
FIG. 6B is the isometric view of FIG. 6A with the outer tool secured over the tire tread.

An inner mold element 80, shown in FIGS. 6A AND 6B, is concentrically received over tread 22. The inner mold element incorporates struts 82 and apertures 84 symmetrical with the outer mold element. Molding material fill tubes 86 (best seen in FIG. 7) interface with apertures 88 (best seen in FIG. 6A) in wheel rim 30. For the embodiment shown, three fill tubes with three mating apertures are employed. Apertures 88 may be created by drilling, machining or punch perforation of the conventional steel or aluminum wheels employed in the non-pneumatic tire and wheel assembly. Temporary seals for the fill tubes in the wheel rim apertures may be created using silicone on other caulking material.

Figure 7:
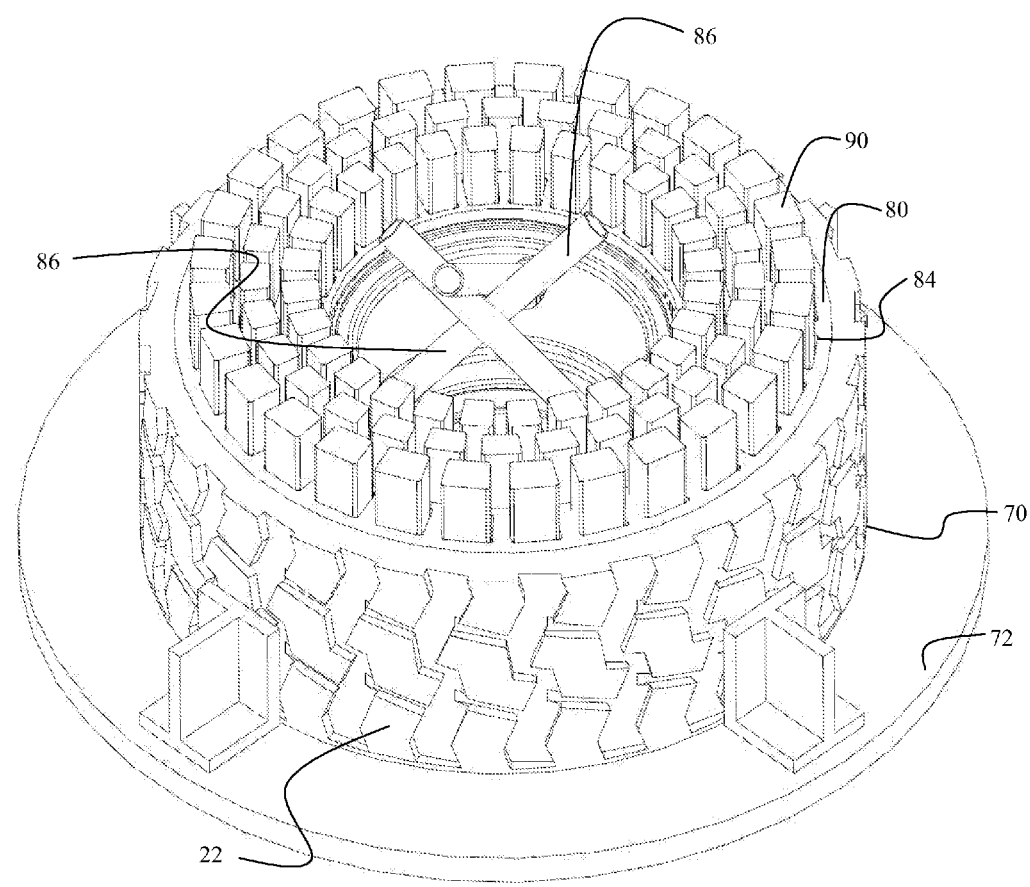
FIG. 7 is a pictorial view of the assembled tooling with mold inserts.

As shown in FIG. 7, rubber casting blocks 90 are inserted through apertures 84 in the inner mold element 80 to be received in the corresponding apertures in the outer mold element 70 to complete the casting mold. Sizing of the struts and apertures in the outer and inner mold elements and the rubber casting blocks provides corresponding sizing of the spokes in the tire body element as cast. For casting, the elastomeric is introduced through the fill tubes to completely fill the interstitial spaces between the rubber mold blocks.

The cast non-pneumatic tire and wheel assembly is then allowed to cure at room temperature and the rubber mold blocks and outer and inner mold elements are then removed. The cast non-pneumatic tire and wheel assembly is then cured at high temperature. For the exemplary PR1664D Urethane material, high temperature cure may be accomplished in 3 hours at 212° F. or 12 hours at 180° F. or 16 hours at 160° F.

While disclosed for the embodiments herein as a pour casting process, in alternative fabrication methods injection molding of the tire body element in standard split molds may be accomplished with bonding of the tread to the tire body element after cure. In other alternative embodiments, the tread may be cast in conjunction with the tire body element using tooling for pressure injection molding.

Figure 8:
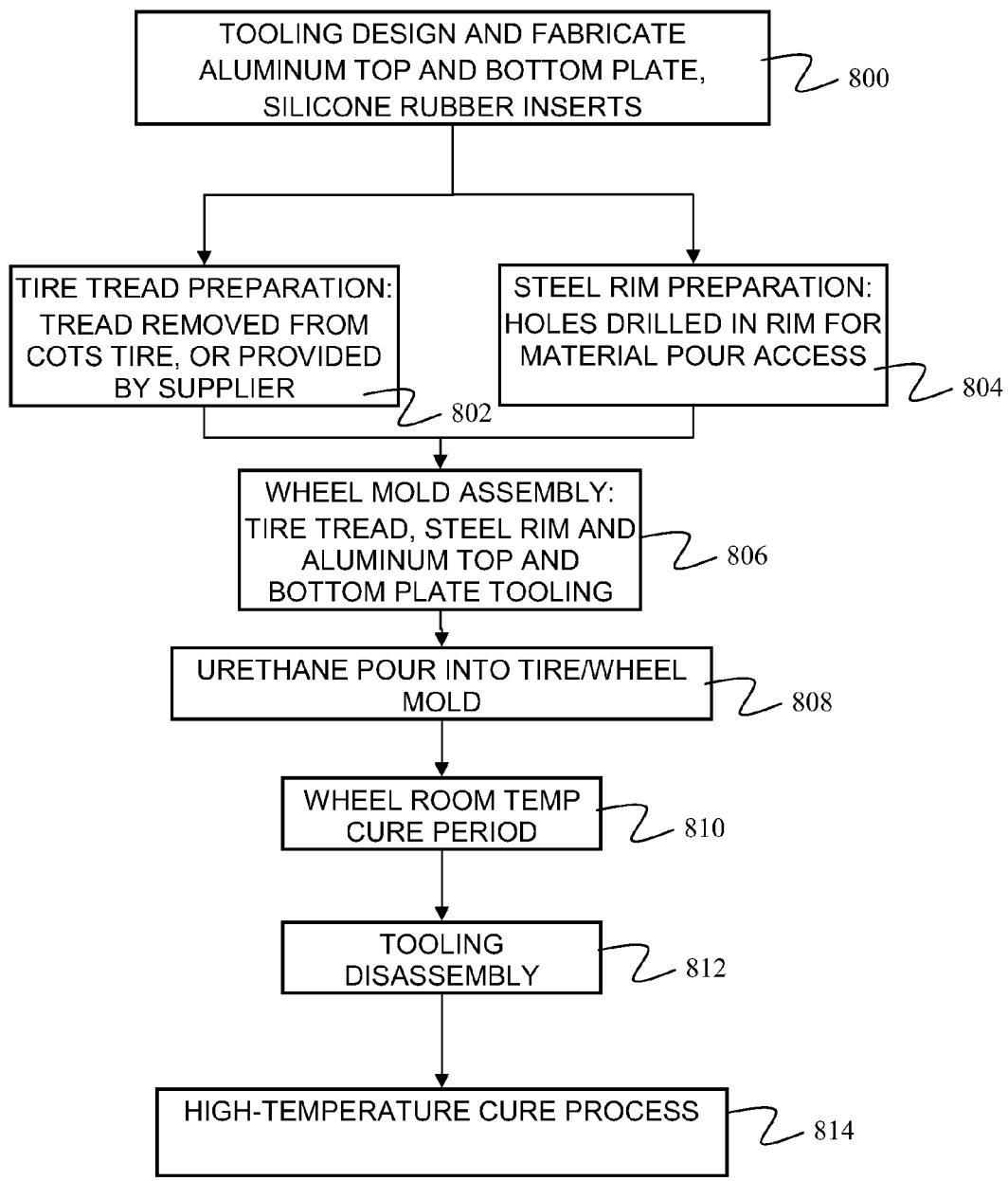
FIG. 8 is a flow chart depicting the mold buildup and molding process for fabrication of the embodiment of FIG. 1.

FIG. 8 demonstrates the manufacturing process for the cast non-pneumatic tire and wheel assembly as described. The inner and outer mold elements are machined or cast from aluminum or other appropriate tooling material with strut and aperture dimensions adapted for the desired spoke design to achieve required structural properties for service use and mating rubber cast blocks are prepared for insertion into the apertures in the inner and outer mold elements, step 800. The tread is then prepared for casting, step 802. Tread from a commercial off the shelf (COTS) tire tread such as that employed for conventional tire retreading may be employed. The conventional steel or aluminum wheel is also prepared, step 804, by machining the fill apertures in the rim. The tread, outer mold element, wheel, inner mold element and rubber casting blocks are then assembled for molding, step 806. The elastomer, urethane for the exemplary embodiment as previously described, is then introduced into the mold assembly through the fill tubes, step 808. The elastomer is allowed to room temperature cure, step 810 and the tooling is then disassembled from the non-pneumatic tire and wheel assembly 812. An elevated temperature post-cure is then accomplished for the non-pneumatic tire and wheel assembly, step 814, providing a completed system.

Figure 9:
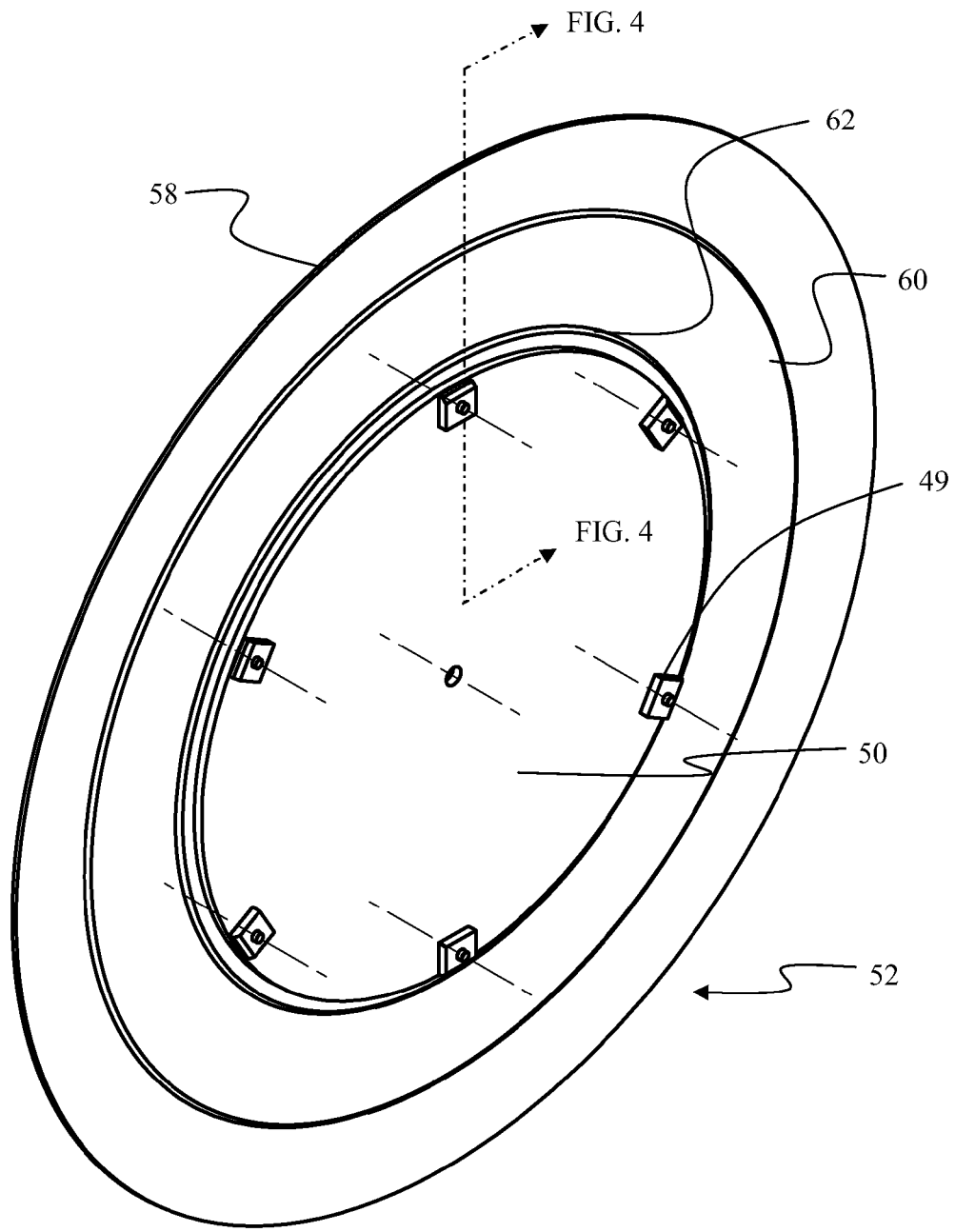
FIG. 9 is an isometric view of the molded cover.

FIG. 9 shows the wheel cover 52 demonstrating the concentric layers 58, 60 and 62 of reducing radius which provide the convex shaping of the cover. For the exemplary embodiment, no curved tooling is required. The curing and bonding process causes a small amount of shrinkage and increase in surface tension in the layers, which when combined with differing thicknesses, causes the part to curve. In alternative embodiments, use of curved tooling may be employed if necessary to obtain the correct shape with different materials or to change the shape of the final part.

Figure 10:
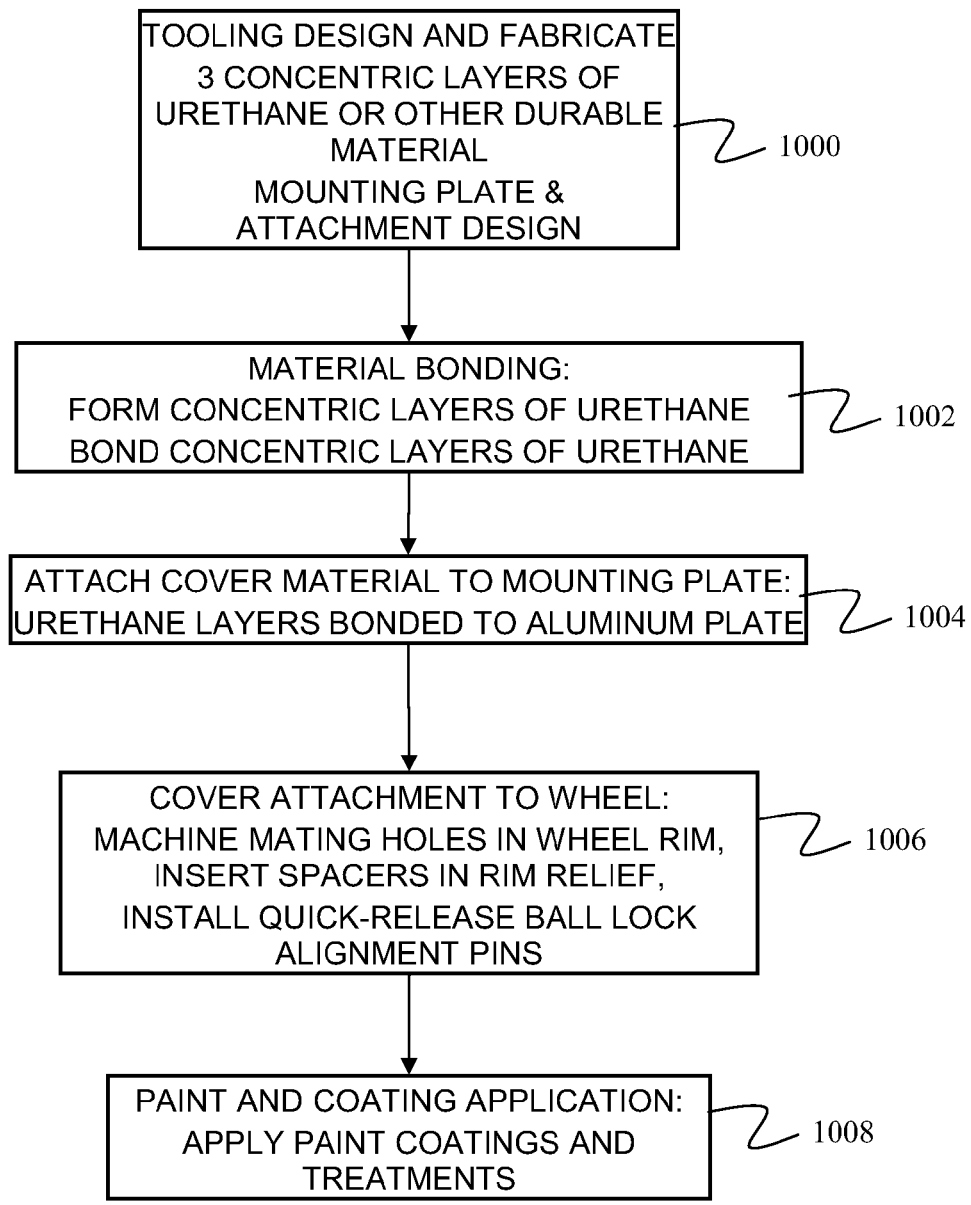
FIG. 10 is a flow chart depicting the process for fabrication of the molded cover.

Fabrication of the cover is accomplished as shown in FIG. 10. Dimensional design of the concentrically reduced radius layers and material selection, urethane for the embodiments described herein, as well as design of the mounting plate for engagement with the convention steel or aluminum wheel rim recess and attachment design for the cover and plate to the wheel is accomplished in step 1000. Fabrication of the cover is accomplished by sequential layup of concentric layers on a caul plate or similar tool and bonding of the layers, step 1002, using heat and pressure in a bladder press. The bonded cover is then attached to the mounting plate by bonding with adhesive in the present embodiment, step 1004. For the embodiment shown, the mounting plate is formed from aluminum. In alternative embodiments, the mounting plate may be plastic or composite, or other material to reinforce the center section of the cover (such as imbedded fiberglass matting). The cover and mounting plate are then attached to the wheel using quick release locking alignment pins received in machined mating holes through the spacers in the wheel rim in the current embodiment, step 1006. The fasteners may be selected to be pressure-sensitive or frangible or both for blast performance enhancement as previously described. Paint and/or other coatings may be applied to the cover, step 1008, before or after mounting.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A method for fabrication of a non-pneumatic tire and wheel assembly comprising:
    forming an inner and an outer mold element having strut and aperture dimensions adapted for a desired spoke design and mating rubber casting blocks to be received in the apertures;
    preparing a tread having an inner wall for casting;

machining fill apertures in a rim of a metal wheel for a vehicle;

assembling the tread, the outer mold element, the wheel, the inner mold element and the rubber casting blocks to form a mold assembly;

introducing an elastomer into the mold assembly through fill tubes inserted in the fill apertures of the wheel;

allowing the elastomer to cure at room temperature to form a tire body element;

disassembling the rubber casting blocks and inner and outer mold elements from tire body element; and post-curing the disassembled the body element at a temperature of at least 160° F. to form a non-pneumatic tire and wheel assembly.

2. The method of claim 1 wherein the step of forming the inner and outer mold elements further comprises:

concentrically receiving the inner and outer mold elements with the tread, the outer mold element intruding into the tread to create a recess in an outer surface of the tire body element.

3. The method of claim 2 further comprising machining mating holes in an outer recess of the rim of the wheel.

4. The method of claim 3 further including fabrication of a cover comprising the steps of:

sequential layup of concentrically reduced radius layers, and, bonding of the layers.

5. The method of claim 4 further comprising attaching the cover to a mounting plate.

6. The method of claim 5 further comprising selecting pressure-sensitive fasteners.

7. The method of claim 6 wherein the step of selecting pressure-sensitive fasteners comprises selecting fasteners from a set of plastic rivets or deformable plastic nuts.

8. The method of claim 6 further comprising attaching the cover and the mounting plate to the wheel using the pressure-sensitive fasteners received in the machined mating holes in the outer recess of the rim of the wheel.

9. The method of claim 5 further comprising selecting frangible fasteners.

10. The method of claim 9 further comprising:

receiving the cover in the recess in the outer surface of the tire body element; and, attaching the cover and the mounting plate to the wheel using the frangible fasteners received in machined mating holes in an outer recess of the rim of the wheel.

11. The method of claim 5 further comprising inserting spacers in a recess in the rim of the wheel.

12. The method of claim 1 wherein the step of introducing an elastomer includes selecting an elastomer having a durometer ranging from approximately 40 to 90 on the Shore A scale.

13. The method of claim 12 wherein the step of selecting an elastomer comprises selecting an elastomer from the set of urethane , Two Component Polyurethane Cast Elastomer Systems having Polyether (PTMEG) Polyol Mixture and Polyether or Polyester/MDI Quasi-Prepolymer Isocyanate, natural rubber, styrene butadiene rubber, and polybutadiene rubber.

14. The method of claim 1 wherein the step of introducing an elastomer includes forming an engagement dome on the outer circumference of the tire body element engaging a mating depression in the inner wall of the tread.

15. A method for fabrication of a blast resistant non-pneumatic tire and wheel assembly comprising:

forming an inner and an outer mold element having strut and aperture dimensions adapted for a desired spoke design and mating rubber casting blocks to be received in the apertures;

preparing a tread having an inner wall for casting;

machining fill apertures in a rim of a metal wheel for a vehicle;

assembling the tread, the outer mold element, the wheel, the inner mold element and the rubber casting blocks, concentrically receiving the inner and outer mold elements with the tread, the outer mold element intruding into the tread to create a recess in an outer surface of a tire body element;

introducing an elastomer into the mold assembly through fill tubes inserted in the fill apertures of the wheel;

allowing the elastomer to cure at a room temperature to form the tire body element;

disassembling the rubber casting blocks and the inner and outer mold elements from the tire body element;

post-curing the disassembled tire body element at a temperature of at least 160° F. to form a non-pneumatic tire and wheel assembly;

fabricating a cover;

attaching the cover to a mounting plate; and attaching the mounting plate to the metal wheel with the cover received in the recess in the outer surface of the tire body element.

16. The method as defined in claim 15 wherein the step of attaching the mounting plate further comprises:

machining mating holes in an outer relief of the rim of the wheel; and, attaching the cover and mounting plate to the wheel using fasteners received in the machined mating holes.

17. The method of claim 16 further comprising selecting the fasteners from the group consisting of frangible fasteners, plastic rivets or deformable plastic nuts.

18. The method of claim 15 wherein the step of fabricating a cover comprises:

sequentially laying up concentrically reduced radius layers, and, bonding the layers.

19. The method of claim 15 wherein the step of introducing an elastomer includes forming an engagement dome on the outer circumference of the tire body element engaging a mating depression in the inner wall of the tread.

20. The method of claim 15 further comprising selecting an elastomer from the set of urethane, Two Component Polyurethane Cast Elastomer Systems having Polyether (PTMEG) Polyol Mixture and Polyether or Polyester/MDI Quasi-Prepolymer Isocyanate, natural rubber, styrene butadiene rubber, and polybutadiene rubber.

* * * * *